Patented Sept. 3, 1940

2,213,806

UNITED STATES PATENT OFFICE 2,213,806

CONCRETE CURING COMPOSITION AND PROCESS

Stanley S. Sorem, Oakland, Calif., assignor to Shell Development Company, San Francisco, Calif., a corporation of Delaware No Drawing. Application August 7, 1939,
Serial No. 288,809

6 Claims. (Cl. 25—154)

In cement concrete construction it is desirable to retard the evaporation of water from the concrete for some time after it has been poured, so that the cement will become thoroughly hydrated and insure a concrete of great strength.

Several methods have been proposed for accomplishing this, among them being the construction of dykes to keep a layer of water over the surface of the concrete, and the use of various coverings such as straw, hay, burlap, canvas, etc. which can be kept wet and which retard evaporation from the concrete as well as protect the concrete from the direct rays of the sun. However, the method which has been found to be the most satisfactory is the use of thin, impervious hydrocarbon films such as asphalt or paraffin over the surface of the concrete to prevent evaporation. Such methods are disclosed in U. S. Patents 1,684,871; 1,767,533; 1,955,421 and 2,143,515 with several modifications. As this method is practiced at present either black asphalt or paraffin is cut back with a light hydrocarbon solvent to a fluid consistency and sprayed or brushed over the surface of the fresh concrete. The black asphalt has very good water retention properties, but cannot be used in many applications, such as buildings, bridges, etc. due to its unsightly color. Further, the dark colors render the asphalt undesirable for use in hot climates, since the dark color absorbs heat from the sun and allows the concrete to cure at too high a temperature. For such applications, paraffin solutions are often used, which have a satisfactory color, but which melt or crack and peel readily, and do not have satisfactory water retaining properties, being much inferior to the black asphalt.

It has been suggested that light colored asphalt solutions, known as albino asphalt or translucent petroleum plastic, can be used for curing concrete, and that its light color will tend to absorb heat to a lesser degree than dark asphalts. Although the albino asphalt absorbs heat to a lesser degree than does the dark asphalt, it does not equal paraffin solutions in its reflecting ability, and, further, when it is pigmented it has been found that the pigment tends to render the asphalt layer porous, unless certain critical types and amounts of pigment are used.

It is an object of the present invention to provide a concrete curing compound which has the desirable water-retaining properties of the heretofore used black asphalts and which has the desirable color of the paraffin concrete curing compounds. It is a further object of this invention to provide a curing compound which does not check or crack and which gradually chalks, so that after the concrete attains its full strength the curing compound rubs or weathers off and tends to disappear.

I have discovered that these desirable properties may be imparted to curing compounds made of light colored asphalt by the proper selection, both as to kinds and amounts, of a combination of fillers and pigments which are used in the asphalt. Further, I have found that only a few fillers and one pigment, namely titanium dioxide can be used in the preparation of curing compounds having the above desirable properties, and that these must be used in certain critical proportions.

One function of the filler is to act as a penetration retarding agent, i. e. it prevents the penetration of the curing compound into the surface of the fresh concrete, which if not checked would destroy the ability of the curing compound to form a water impervious film. In curing, concrete exerts a sucking force on its surface and liquid or plastic compounds spread on it are drawn into the concrete unless they are sufficiently resistant to counteract this force. I have found that the amount of pigment which is used to impart the desired light color to the albino asphalt is insufficient for this purpose and that the presence of a certain amount of fillers other than pigment is necessary to give the curing compounds made from albino asphalt sufficient body to prevent their being sucked into the concrete. Other functions of the filler are to induce chalking and to enhance the effect of the titanium dioxide pigment. It has also been found that the light colored asphalt must have an A. S. T. M. penetration at 77° F. of less than 75, or better yet, 50, to produce a compound which will not penetrate into the concrete, and asphalts having an A. S. T. M. penetration of 10 or less are preferred.

It has, moreover, been found that cut-backs, i. e. asphalts dissolved in a volatile hydrocarbon solvent, produce more suitable curing films than emulsified asphalts, the reason apparently being that emulsified asphalts do not coalesce to form a solid film as well as do the asphalt solutions; and thus water necessary for the proper curing of the concrete is allowed to escape through the small holes left in the porous films produced from emulsions.

The preferred filler is talcum, although other finely divided, non-emulsifying and preferably imporous, light colored, oleophilic mineral fillers such as ground limestone, mica, pumice and volcanic ash may be used. I have found that to produce satisfactory results the amount of filler other than the pigment must be from 14 to 28% by weight, based on the solvent-free film. Porous fillers which do not have an emulsifying action such as diatomaceous earth may also be used if the voids of the filler are filled with hydrocarbon. For instance, when using diatomaceous earth it has been found necessary to heat the albino asphalt with the filler so that all of the air which is entrapped in the voids of the earth is displaced with asphalt. Such porous fillers are less desirable than those mentioned above due to the difficulty of getting complete saturation of the filler. Colloidal fillers are not suitable due to their emulsifying action. In addition, from about 6 to 12% of titanium dioxide filler must be used to produce compounds of satisfactory color. As will be later seen, the best curing compounds are obtained when about 21% of the filler and about 9% of the pigment are used. Colloidally active mineral fillers such as bentonite have been found to prevent the formation of water impervious films due to the fact that such substances absorb water and act like a wick, thus allowing the water of the concrete to escape.

To demonstrate the effect of adding a pigment and filler to concrete curing compounds, the following tests were carried out. Small cylinders 2" x 4" of cement concrete were prepared according to the A. S. T. M. procedure for making concrete test specimens and immediately thereafter they were sprayed on all sides with the curing compound to be tested, weighed and placed in an oven having a constant temperature of 100° F. and a relative humidity of 15%. The amount of curing compound per unit of surface was the same for all specimens. At the end of 7 days the cylinders were again weighed to determine their moisture loss, allowance being made for the loss of solvent from the curing compound. Cylinders which were cured with black asphalt were given the basic rating of 1, since the black asphalts have proved satisfactory from a moisture retention viewpoint, and the moisture loss of the others was expressed as:

$$\frac{\text{Loss of moisture in test specimen}}{\text{Loss of moisture in specimen cured with black asphalt}}$$

In another series of tests to measure resistance to light absorption, samples of cement concrete were prepared and coated with various curing compounds and thermometers were imbedded in the fresh concrete and the samples were exposed to sunlight. Since the paraffin treating compounds are satisfactory from the standpoint of heat reflection the samples coated with paraffin were given the rating 1, and the heat absorption of the other samples was expressed as:

$$\frac{\text{Temperature of test sample-air temperature}}{\text{Temperature of paraffin coated sample-air temperature}}$$

According to the above methods of rating, the lower the rating number, the better is the curing compound. On this basis the following results were obtained when various mixtures given were mixed with light hydrocarbon solvents to render them readily flowable. All parts are by weight.

| Binder | Filler | Pigment | Moisture loss | Heat absorption |
|---|---|---|---|---|
| Paraffin | None | None | Above 3 | 1.0 |
| Black asphalt (5 pen.) | do | do | 1.00 | 2.1 |
| 10 pen. albino asphalt | do | do | 1.17 | 1.6 |
| 10 pen. albino asphalt 80% | Talc 14% | TiO₂ 6% | 1.16 | 1.5 |
| 10 pen. albino asphalt 70% | Talc 21% | TiO₂ 9% | .92 | 1.3 |
| 10 pen. albino asphalt 60% | Talc 28% | TiO₂ 12% | 1.50 | 1.2 |
| 10 pen. albino asphalt 50% | Talc 35% | TiO₂ 15% | 2.00 | 1.1 |
| 50 pen. albino asphalt 70% | Talc 21% | TiO₂ 9% | 1.25 | |
| Do.* | do | TiO₂ 9% | 1.73 | |

*Used as emulsion.

From these data it can be seen that the combined pigment and filler should be between about 20 to 40% by weight of the mixture of albino asphalt filler and pigment, and that the amount of the filler should be between about 2 to 3 times the amount of the pigment. The ideal combination consists of about 21% talc filler, 9% of titanium dioxide, and 70% of 10 penetration albino asphalt. A curing compound made according to this formula has even better water retention ability than unpigmented black asphalt and its heat absorption is only slightly greater than that of paraffin. When the amount of filler and pigment are reduced to 21 and 9%, respectively, the compound allows a slightly greater moisture loss and heat absorption, although they are still fairly satisfactory. Smaller amounts produce compounds which are unsatisfactory from the heat absorption standpoint. When the amounts of filler and pigment are 28 and 12%, respectively, the moisture loss is somewhat increased, but is still satisfactory. However, if the respective amounts are increased to 35 and 15%, the moisture loss becomes excessive, and the compounds so produced are not satisfactory for curing concrete. Similarly, the compound containing 50 penetration asphalt and used as a cut-back was satisfactory but it was found that compounds containing asphalt softer than about 75 A. S. T. M. at 77° F. were not suitable.

Further to show the superiority of the curing compounds of the present invention over those previously known, specimens were prepared as above and were kept under the same conditions of temperature and moisture. The specimens were weighed at the end of 2 and 27 days and the moisture loss determined. At the end of the 27th day the samples were crushed in a machine which compressed the specimens at the rate of $\frac{1}{100}$ inch per minute. The following results were obtained:

| Curing compound | Water loss in grams | | Strength at 27 days (crushing force in lbs.) |
|---|---|---|---|
| | 2 days | 27 days | |
| Paraffin | 21.9 | 29.2 | 4,150 |
| Black asphalt | 10.3 | 24.8 | 5,975 |
| Albino +% talc +% TiO₂ | 8.6 | 27.7 | 6,650 |
| Albino +% limestone +% TiO₂ | 15.5 | 29.1 | 5,825 |
| Albino +% silica +% TiO₂ | 13.5 | 28.8 | 5,900 |

Thus it is shown that the curing compounds of the present invention are capable of producing concrete of greater strength than even the black asphalts heretofore used.

As is known albino asphalts can be obtained from most asphaltic and mixed base crude oils by solvent extraction and distillation methods, such as those set out in U. S. Patents of Merrill 2,081,496, Crawley 2,114,796 and the application of Anderson, Serial No. 186,133, filed January 21, 1938.

Albino asphalts are characterized by their plasticity, translucency, freedom of asphaltines and complete solubility in light naphtha. At least two types may be distinguished according to their solubility in acetone, one type being soluble at 77° F. in an equal volume of acetone and the other being substantially insoluble. In general, the acetone-insoluble type albino asphalts are preferred, since they have a lower temperature susceptibility and therefore a given asphalt can be used under a greater range of climatic conditions.

Other asphalts, although not strictly albino asphalts, may be used if they are of sufficiently light color that they can be pigmented to the extent that they present a light-colored surface which absorbs heat to a smaller degree than the unpigmented asphalts.

The translucency of asphalts may be measured by determining the A. S. T. M. color of a 0.1% by weight test solution of the asphalt in a suitable substantially colorless solvent such as carbon tetrachloride, benzene, etc. Dark asphalt of the type previously used in curing concrete has an A. S. T. M. color of 4½ to 5 or higher when diluted in this way, while asphalts suitable for the purposes of this invention have A. S. T. M. colors of 3½ or less. Therefore, in referring to albino asphalts, it is understood that those asphalts are meant which have colors of 3½ or less on dilution.

In use, the pigmented and filled albino asphalts are cut back with any light hydrocarbon solvent such as gasoline, kerosene, fraction or mixtures thereof until they can be readily sprayed or painted. The curing compound is then sprayed or brushed over the surface of the concrete. This is preferably done as soon as the concrete is in place, but is also beneficial if done shortly after the initial set of the concrete.

I claim as my invention:

1. The process of curing concrete comprising applying to the surface thereof a thin substantially continuous film comprising from 60 to 80% light colored asphalt having an A. S. T. M. penetration of not more than 75 at 77° F., and from 40 to 20% of a mixture of light colored non-colloidal mineral filler and titanium dioxide, the amount of filler in said mixture being 2 to 1 times the amount of the titanium dioxide.

2. The process of curing concrete comprising applying to the surface thereof a thin substantially continuous film comprising from 60 to 80% light colored asphalt having an A. S. T. M. penetration at 77° F. of not more than 50, from 14 to 28% finely divided, light colored, non-colloidal mineral filler and from 6 to 12% of titanium dioxide, the whole being cut back with a light hydrocarbon solvent.

3. The process of curing concrete comprising applying to the surface thereof a thin substantially continuous film comprising about 70% light colored asphalt having an A. S. T. M. penetration at 77° F. of not more than 10, about 21% finely divided, light colored, non-colloidal mineral filler and about 9% titanium dioxide, the whole being cut back with a light hydrocarbon solvent.

4. The process of claim 1 in which the light colored asphalt has on dilution with 99.9 parts by weight of a light colored hydrocarbon solvent an A. S. T. M. color of less than 3½.

5. As a new product a concrete curing compound comprising an albino asphalt containing from 14 to 28% finely divided, light colored, non-colloidal mineral filler and from 6 to 12% titanium dioxide.

6. The process of claim 1 wherein the mineral filler is talc.

STANLEY S. SOREM.